United States Patent
Gandhi et al.

(10) Patent No.: US 12,332,856 B2
(45) Date of Patent: Jun. 17, 2025

(54) AUTOMATED DATA QUALITY DETECTION FOR UNSTRUCTURED DATA

(71) Applicant: DISH Wireless L.L.C., Englewood, CO (US)

(72) Inventors: Darshit Gandhi, Centennial, CO (US); Sindhu Chowdary Chirumamilla, Englewood, CO (US)

(73) Assignee: DISH Wireless L.L.C., Englewood, CO (US)

(*) Notice: Subject to any disclaimer, the term of this patent is extended or adjusted under 35 U.S.C. 154(b) by 125 days.

(21) Appl. No.: 18/209,273

(22) Filed: Jun. 13, 2023

(65) Prior Publication Data

US 2024/0419641 A1    Dec. 19, 2024

(51) Int. Cl.
*G06F 16/215* (2019.01)
*G06F 16/38* (2019.01)
*G06F 16/901* (2019.01)

(52) U.S. Cl.
CPC .......... *G06F 16/215* (2019.01); *G06F 16/38* (2019.01); *G06F 16/9024* (2019.01)

(58) Field of Classification Search
CPC ...... G06F 16/215; G06F 16/38; G06F 16/383; G06F 16/387; G06F 16/9024
See application file for complete search history.

(56) References Cited

U.S. PATENT DOCUMENTS

| | | | | |
|---|---|---|---|---|
| 10,621,182 | B2* | 4/2020 | Scriffignano | G06F 40/194 |
| 11,574,204 | B2* | 2/2023 | Lu | G06N 20/00 |
| 11,620,320 | B1* | 4/2023 | Shukla | G06F 40/30 |
| | | | | 707/692 |
| 2005/0246353 | A1* | 11/2005 | Ezer | G06F 40/186 |
| 2013/0097125 | A1* | 4/2013 | Marvasti | G06F 16/90 |
| | | | | 707/E17.002 |
| 2018/0189908 | A1* | 7/2018 | Doyle | G06F 16/24575 |
| 2022/0215046 | A1* | 7/2022 | Huffner | G06F 16/9024 |

OTHER PUBLICATIONS

Nesca M, Katz A, Leung CK, Lix LM. A scoping review of preprocessing methods for unstructured text data to assess data quality. Int J Popul Data Sci. Oct. 4, 2022. (Year: 2022).*
Kiefer, "Assessing the quality of unstructured data: an initial overview," Computer Science, 2016, 12 pages.
Taleb et al., "Big Data Quality Assessment Model for Unstructured Data," arXiv, Nov. 2018, 6 pages.

* cited by examiner

*Primary Examiner* — Kris E Mackes
(74) *Attorney, Agent, or Firm* — Fish & Richardson P.C.

(57) ABSTRACT

This disclosure relates to assessment of data quality for unstructured data. In some aspects, a method includes obtaining, by one or more computing devices, metadata of multiple data files; analyzing a graph database representative of the multiple data files and generated using the metadata, to identify unstructured data included in one or more data files, the graph database representing features of the multiple data files, and relationships among the features of the multiple data files; obtaining a set of customized rules for the unstructured data based on context of the unstructured data; determining that the unstructured data fails to satisfy the set of customized rules; and in response to determining that the unstructured data fails to satisfy the set of customized rules, modifying the unstructured data to satisfy the set of customized rules.

20 Claims, 4 Drawing Sheets

AUTOMATED DATA QUALITY DETECTION FOR UNSTRUCTURED DATA

TECHNICAL FIELD

This specification generally relates to data processing.

BACKGROUND

Data quality is the measure of how well suited a data set is to serve its specific purpose. Data that is deemed fit to serve the specific purpose in a particular context is considered high quality data. Low quality data can be of low value and lead to poor decision making.

SUMMARY

With the development of communication technologies, such as 5G technologies, applications supporting a massive number of connected devices are enabled. Such applications can be based on data from myriad sources, including third party sources. In the meantime, the applications in the 5G network require fast data processing and low latency to enable real-time communications. The data of the applications can include unstructured data, which makes it difficult for application developers to parse, analyze and use the data efficiently.

This specification describes technologies that provide an efficient and automatic way to process large scale unstructured data to identify low quality unstructured data and address the low quality unstructured data. More specifically, these technologies generally involve identifying data files or documents including unstructured data, automatically triggering assessment code for assessing the data quality of the unstructured data to determine whether the unstructured data satisfies a set of rules; generating a report for the data quality of the unstructured data; and making modification on unstructured data not satisfying one or more rules to improve the data quality.

In general, one innovative aspect of the subject matter described in this specification can be embodied in methods that include the actions of obtaining, by one or more computing devices, metadata of multiple data files; analyzing a graph database representative of the multiple data files and generated using the metadata, to identify unstructured data included in one or more data files, the graph database representing features of the multiple data files, and relationships among the features of the multiple data files; obtaining a set of customized rules for the unstructured data based on context of the unstructured data; determining that the unstructured data fails to satisfy the set of customized rules; and in response to determining that the unstructured data fails to satisfy the set of customized rules, modifying the unstructured data to satisfy the set of customized rules.

Other embodiments of this aspect include corresponding computer systems, apparatus, computer program products, and computer programs recorded on one or more computer storage devices, each configured to perform the actions of the method. A system of one or more computers can be configured to perform particular operations or actions by virtue of having software, firmware, hardware, or a combination of them installed on the system that in operation causes or causes the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations, the method can include triggering assessment code corresponding to the set of customized rules on the unstructured data to check whether the unstructured data satisfies the set of customized rules.

In some implementations, the method can include converting the unstructured data into structured data; and triggering assessment code corresponding to the set of customized rules on the structured data to check whether the structured data satisfies the set of customized rules.

In some implementations, the method can include determining a data quality score for the unstructured data in each data file. In some implementations, the method can include determining a data quality score that is a combined quality score based on data quality assessment for each rule included in the set of customized rules.

In some implementations, determining the set of customized rules can include performing natural language processing on metadata of the unstructured data of each data file to determine the context of the unstructured data, wherein the metadata comprises a data dictionary; and determining the set of customized rules that are applicable to the unstructured data using the context of the unstructured data.

In some implementations, the method can include running a machine learning model to determine potential modifications for rectifying the unstructured data not satisfying one or more rules in the set of customized rules.

Particular implementations of the subject matter described in this disclosure can be implemented so as to realize one or more of the following advantages. An automatic and efficient way of assessing data quality of unstructured data from various sources is provided, in which unstructured data of low data quality from diverse sources can be identified. By identifying the low-quality unstructured data, users (e.g., developers) can learn about the inconsistencies and inaccuracies of the unstructured data that would otherwise harm the decision-making process. Furthermore, an automatic and efficient way of improving the data quality of the unstructured data is provided. Modifications can be made on the low-quality unstructured data to eliminate the inconsistencies and inaccuracies, in which the low-quality unstructured data can be fixed to enhance the value of the unstructured data. The low-quality unstructured data can be modified, so that the modified unstructured data satisfies the set of rules for checking data quality. By automatically improving the data quality of unstructured data, the technologies described herein can enhance efficiency of data processing, reduce latency and cost of data analysis, and improve data accuracy and consistency for applications, which can lead to informed decision making and improved user experience.

It is appreciated that methods and systems in accordance with the present disclosure can include any combination of the aspects and features described herein. That is, methods and systems in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

As discussed above, as communication technologies advance, including the emergence of 5G, applications require rapid data processing and low latency, while data used in these applications can be large in volume and complex in variety. The data can include a great quantity of diverse information from various data sources/data owners. The data can include structured data and unstructured data. The unstructured data can be difficult to analyze, time-consuming to parse through, or require additional resources and expertise to leverage efficiently. It is essential to obtain high quality unstructured data for product development and decision making.

The technology described herein provides an efficient way of identifying unstructured data from various data sources, assessing data quality of the unstructured data based on a set of rules including rules specific to unstructured data in each data file; identifying unstructured data with low quality (not satisfying one or more rules); and automatically improving the data quality of low-quality unstructured data.

Figure 1:
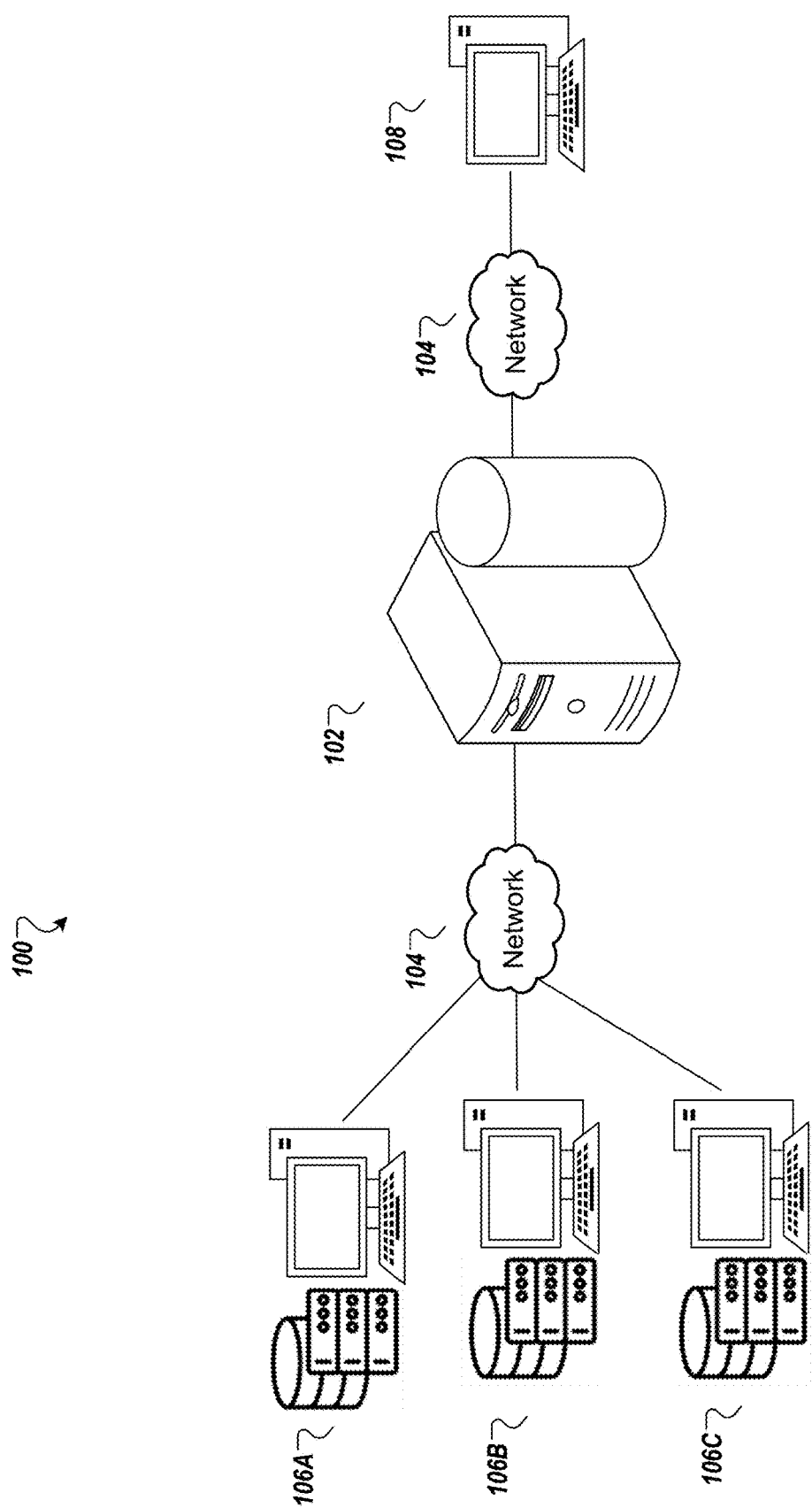
FIG. 1 is an example system for assessing and improving the data quality of unstructured data.

FIG. 1 is a block diagram of an example environment 100 for assessing and improving data quality of unstructured data in accordance with technology described herein. The example environment 100 includes a computing system 102 including one or more computing devices, a network 104, one or more data sources 106A-106C (collectively referred to as 106), and a user device 108.

The one or more data sources 106 can be located in different sites either on the same network or entirely different networks. Each data source 106 can have its own data included in data files. The data of each data source 106 can include structured data, unstructured data, or both. Structured data refers to data that is organized in a specific format or structure, making it easy to search, process, and analyze using automated tools. This data is typically stored in databases, spreadsheets, or other data management systems. Structured data is characterized by the presence of clearly defined fields, columns, and rows, and often follows a consistent format or syntax. Examples of structured data include financial data, inventory data, customer information, and transactional data. Unstructured data refers to data that is not organized in a specific format or structure, making it difficult to process and analyze using automated tools. This data is often created in a free-form manner and does not follow a consistent syntax. For example, unstructured data is a conglomeration of many varied types of data that are stored in their native formats, which can result in irregularities and ambiguities that make it difficult to understand as compared to structured. Examples of unstructured data can include emails, social media posts, audio and video recordings, images, and text documents. Unstructured data is more difficult to analyze and interpret than structured data because it requires natural language processing and other advanced techniques to extract insights and meaning. However, unstructured data can provide valuable insights into customer sentiment, market trends, and other areas that are not easily captured by structured data.

Each data source 106 can have one or more data dictionaries describing its data files. The data dictionary can include information or metadata about data of the data files such as attributes, meaning, origin, usage, and format of the data included in the data files. For example, the metadata associated with the data files can include a plurality of features of the data included in the data files. The plurality of features can include at least one of: a file name, a table name, an attribute, a row name, and a column name. One of the features can be an attribute indicating whether a corresponding data file includes unstructured data.

The data dictionaries of the data sources 106 can be used to create a graph database representing metadata of the data files from one or more data sources 106. Specifically, relationships among the plurality of features of different data files can be determined using the data files' data dictionaries. For example, a relationship can be two data files sharing the same attribute. A graph database can be created to reflect the features and the relationships of the features for different data files. The graph database can be represented as a directed graph that includes a set of nodes and a set of edges. Each node can represent a feature of the plurality of features. Each edge can represent a relationship between two nodes in the set of nodes (e.g., relationships among the plurality of features of the data files). As a result, the graph database can include the relationships (e.g., interconnections and interrelationships) of the data files from various data sources with respect to the features of the data files. An example graph database is described in FIG. 3.

In some implementations, the graph database can be generated by the computing system 102 in advance based on the data dictionaries received from the data sources 106. In some implementations, the graph database can be generated by another computing system (not shown). The computing system 102 can access the graph database from that computing system over the network.

The computing system 102 can traverse the graph database to identify unstructured data included in one or more data files from the data sources 106. The computing system 102 can further identify, from the graph database, the data sources 106 of data files that include unstructured data. For example, in a graph database, the data source 106 of each data file can be a represented as a node connected to another node representing the data file. In some implementations, the graph database can include a feature that indicates storage locations of particular data files. The computing system 102 can obtain the unstructured data, based on the storage location of the unstructured data, from the data source 106 and run assessment code on the computing system 102 to check the data quality of the unstructured data. In some implementations, the computing system 102 can provide the assessment code to the data source 106, so that the assessment code can be run at the data source 106.

The assessment code can check whether the unstructured data of the data files satisfies a set of rules. The set of rules can include customized rules that are specific to the use case of the unstructured data. For example, if the unstructured data is a log for user interactions with different applications, the customized rules can include rules to check whether the user's account includes a valid email address, but not whether the user provides a valid physical address. In another example, if the unstructured data includes online shopping orders, the customized rules include rules to check whether the shipping address is a valid physical address, and whether the shipping address is consistent with the postal code. In some implementations, the computing system can use machine learning models to determine the general rules and the customized rules for the unstructured data.

The computing system 102 can generate a data quality report for the unstructured data including i) the data quality results for the unstructured data in each data file and ii) recommendations of potential modifications for rectifying unstructured data not satisfying one or more rules included in the set of rules. The data quality report can be displayed on a user device 108. The user device 108 can be associated with a developer that utilizes the unstructured date and develops data products, artificial intelligence (AI)/machine learning (ML) algorithms, and dashboards. In some implementations, the data quality report can be provided to a user device 108 associated with a data owner of the unstructured data or an administrative user managing the unstructured data.

The computing system 102 can further provide the potential modifications to the unstructured data as a recommendation to the user device 108, so that the user of the user device 108 can determine whether to adopt that modification. In response to receiving the user's confirming to rectify the unstructured data not satisfying the one or more rules, the computing system 102 can proceed to make the modification. The computing system 102 can trigger rectifying code to make the modifications.

In some implementations, the computing system 102 can obtain the unstructured data, based on the storage location of the unstructured data, from the data source 106 and run the rectifying code on the computing system 102. In some implementations, the computing system 102 can provide the rectifying code to the data source 106, so that the rectifying code can be run at the data source 106.

The computing system 102 can include one or more computing devices, such as a server. The number of computing devices may be scaled (e.g., increased or decreased) automatically as per the computation resources needed. The various functional components of the computing system 102 may be installed on one or more computers as separate functional components or as different modules of a same functional component. For example, the various components of the computing system 102 can be implemented as computer programs installed on one or more computers in one or more locations that are coupled to each through a network. In cloud-based systems for example, these components can be implemented by individual computing nodes of a distributed computing system.

The user device 108 can include personal computer, mobile communication device, and other devices that can communicate with the computing system 102 over the network 104. The network 104 can include a local area network ("LAN"), wide area network ("WAN"), the Internet, or a combination thereof. Each data source 106 can include one or more computing devices, such as a server. Each data source 106 can have its own database that stores its data files and corresponding data dictionaries.

Figure 2:
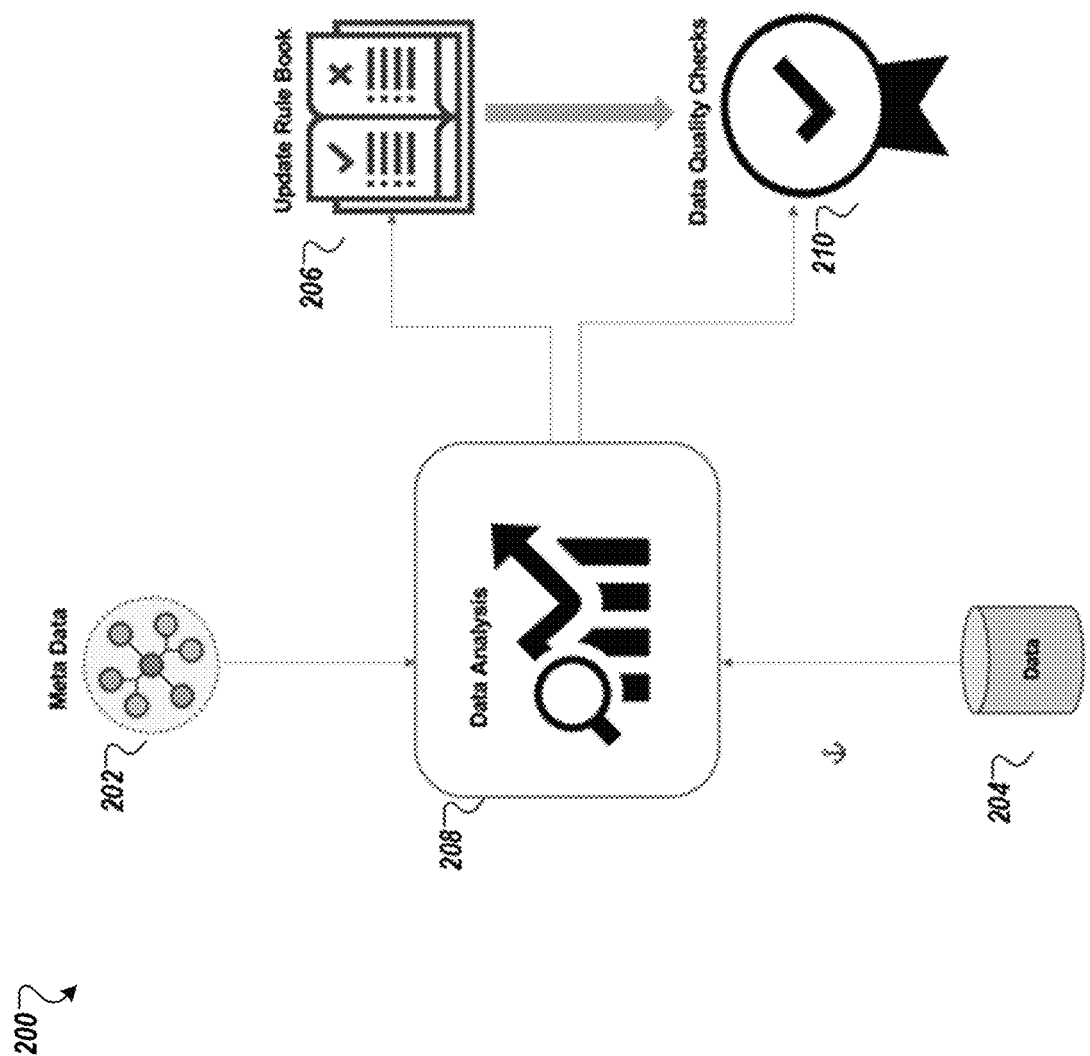
FIG. 2 is a block diagram of an example procedure for assessing and improving the data quality of unstructured data.

FIG. 2 is a block diagram of an example procedure 200 for assessing and improving the data quality of unstructured data in accordance with technology described herein. In some implementations, at least a portion of the procedure 200 can be executed at the computing system 102.

Figure 4:
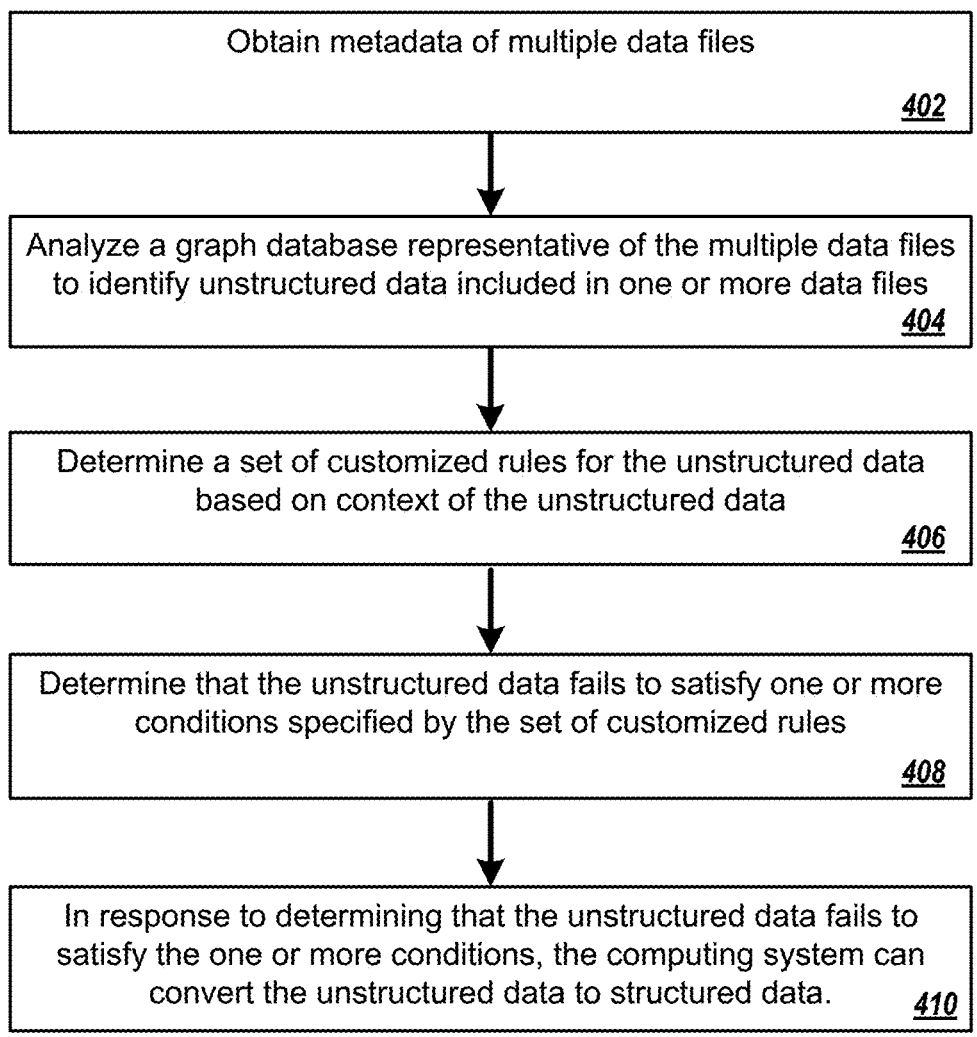
FIG. 4 is a flow diagram of an example process for assessing and improving the data quality of unstructured data.

The computing system can traverse the graph database 202 representing the metadata of data files to identify unstructured data. The graph database 202 can include the storage location of the identified unstructured data. Based on the storage location, the computing system can obtain the unstructured data 204 from the corresponding data source. The computing system can determine a set of rules 206 for the unstructured data 204. The set of rules can include customized rules specific to the unstructured data. Based on the set of rules, the computing system can perform data analysis 208, such as data quality assessment, on the unstructured data to check whether the unstructured data 204 satisfies the set of rules 206. The computing system can generate a data quality report 210 including the results of the data quality assessment. FIG. 4 and associated descriptions provide additional details of these implementations.

Figure 3:
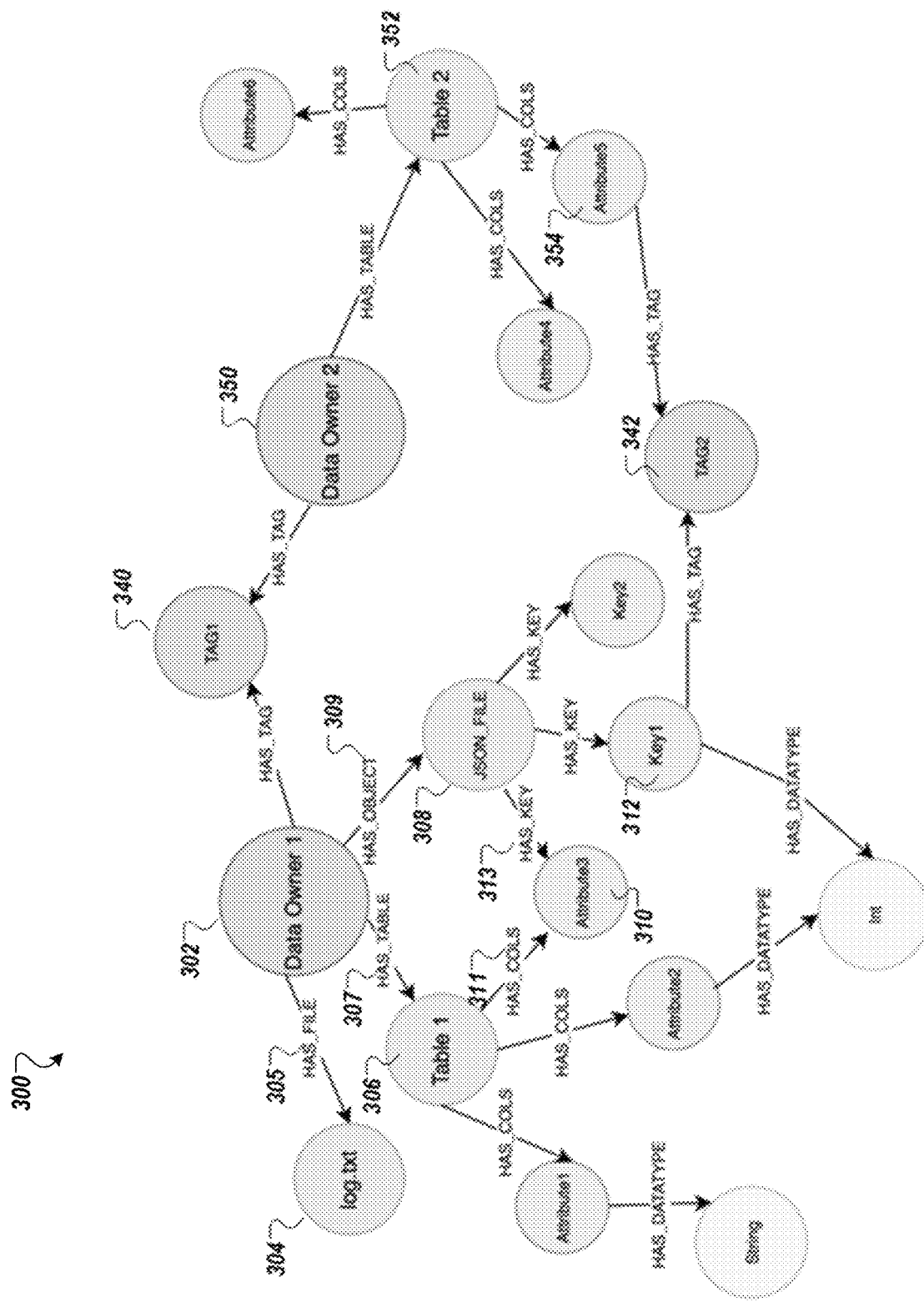
FIG. 3 is an example of the graph database representing metadata of data files.

FIG. 3 is an example of the graph database 300 representing metadata. The graph database 300 represent metadata of data files from two data sources/owners. The nodes in the graph database 300 include the plurality of features of the data files, including data sources/owners, data file names, attributes including keys, and tags. The edges in the graph database 300 represent the relationships between two nodes (e.g., relationships among the plurality of features of the data files from the two data sources).

For example, the relationships can be that the "Data Source 1" 302 has a data file named "log.txt" 304, has a table named "Table 1" 306, and has an object "JSON_FILE" 308. Such relationships are represented by edges 305, 307, and 309. In some implementations, the edges can be directed line with labels indicating the specific relationships. For example, the relationship of "Data Source 1" 302 having a data file named "log.txt" 304 can be represented by an edge 305 directed from the node "Data Source 1" 302 to the node "log.txt" 304. The label of the edge 305 can be "has file" to indicate the specific relationship.

In some examples, a relationship can be a data file including certain attributes or keys. For instance, the table named "Table 1" 306 can include "Attribute3" 310. The object data file named "JSON_FILE" 308 can include the same attribute "Attribute3" 310 as a key. Such relationships can be represented by the edge 311 directed from the node "Table 1" 306 to the node "Attribute3" 310 with label "has column" and by the edge 313 directed from the node "JSON_FILE" 308 to the node "Attribute3" 310 with label "has key."

In some examples, a relationship can be two data files sharing the same attribute. Because the graph database includes the two edges 311 and 313 having a common node 310, the graph database indicates the relationship between the two data files "Table 1" 306 and "JSON_FILE" 308 that the two data files share the same attribute "Attribute3" 310.

In some examples, a relationship can be two data sources sharing the same tag. For example, "Data Source 1" 302 and "Data Source 2" 350 share the same tag "TAG 1" 340. In some examples, a relationship can be two attributes from data files of two separate data sources share the same tag. For example, the attribute "Key1" 312 of the data file "JSON_FILE" 308 from "Data Source 1" 302 and the attribute "Attribute5" 354 of the data file "Table 2" 352 from "Data Source 2" 350 share the same tag "TAG2" 342.

FIG. 4 is a flow diagram of an example process 400 for generating and using a graph database. In some implementations, at least a portion of the process 400 can be executed at the computing system 102.

At step 402, the computing system can obtain metadata of multiple data files. The metadata can include data dictionaries of the data files. The data dictionary of a data file can include information or metadata about data of the data file, such as attributes, meaning, origin, usage, and format of the data included in the data files. One of the attributes can indicate whether a data file includes unstructured data.

The graph database can be generated using the metadata of data files, e.g., data dictionaries. Accordingly, the graph database can also include a feature indicating whether a data file includes unstructured data. Specifically, by analyzing the metadata of the multiple data files, relationships among the plurality of features of different data files can be determined. A graph database can be created to reflect the features and the relationships of the features for different data files. The graph database can be a directed graph that includes a set of nodes and a set of edges. Each node in the set of nodes can represent a feature of a plurality of features of the data files. For example, nodes included in the graph database can represent data file names, data sources, attributes, and tags. Each edge can represent a relationship between two nodes in the set of nodes (e.g., relationships among the plurality of features of the data files).

For example, edges included in the graph database can represent relationships among the data files, relationships between the data files and the data sources, relationships among the data sources, relationships among attributes of different data files, and relationships between the attributes and the data files. For example, the relationships can be that the "Data Source 1" has a data file named "log.txt", has a table named "Table 1", and has an object "JSON_FILE". In some examples, a relationship can be a data file including certain attributes or keys. In some examples, a relationship can be two data files sharing the same attribute. In some examples, a relationship can be two data sources sharing the same tag.

At step 404, the computing system can analyze the graph database representative of the multiple data files to identify unstructured data included in one or more data files from the multiple data sources.

As discussed above, the graph database can include a feature for each data file indicating whether the data file includes unstructured data. The computing system can traverse or scan the graph database and identify data files that include unstructured data based on such a feature of the data files. Unstructured data is information that either does not have a pre-defined data model or is not organized in a pre-defined manner. Unstructured data is typically text-based but can contain non-textual data such as images, videos, etc. Unstructured data is usually stored in its native format, not in a structured database format, which can result in irregularities and ambiguities that make it difficult to understand as compared to data stored in fielded form in databases. Unstructured data can include images, text, JSON, comma-separated values (CSV), audio and video files, emails, social media posts, and the like. For example, the data file named "log.txt" include unstructured data.

The computing system can further identify, from the graph database, the data sources of the data files including unstructured data. For example, the data source of each data file can be a node connected to the node representing the data file. In some implementations, the data source can include a feature indicating a storage location of the data file.

At step 406, the computing system can determine a set of customized rules for the unstructured data based on context of the unstructured data. The set of customized rules can specify rules to be satisfied by the unstructured data, such as requirements and criteria that are specific to the use case or context of the unstructured data. For example, the set of customized rules can include rules to allow for the measurement of different data quality dimensions, such as contextual accuracy of values, consistency among values, allowed format of values, completeness of values, and the like.

For instance, when the unstructured data is a user interaction log across multiple applications, the customized rules can entail verifying the existence of a valid email address in the user's account.

The computing system can use metadata of the unstructured data to determine the context of the unstructured data of each data file. The computing system can analyze the metadata of the unstructured data using natural language processing to determine the context of the unstructured data. The metadata includes the data dictionary of the unstructured data. The computing system can determine the set of customized rules that are applicable to the unstructured data using the context of the unstructured data.

For example, the context for a data file including unstructured data indicates that the unstructured data includes a log for user interactions with different applications. For such context, the customized rules can include rules to check whether the user's account includes a valid email address, but not whether the user provides a valid physical address. In another example, the context of another data file including unstructured data indicate that the unstructured data includes online shopping orders. For such context, the customized rules include rules to check whether the shipping address is a valid physical address, and whether the shipping address is consistent with the postal code.

At step 408, the computing system can determine that the unstructured data fails to satisfy the set of customized rules. The computing system can perform data quality assessment on the unstructured data of the identified data files using the set of customized rules to obtain the data quality results. In some implementations, the computing system can trigger assessment code on the unstructured data to check the data quality. The assessment code can check whether the unstructured data of the data files satisfies the set of customized rules.

For example, to check whether the user's account includes a valid email address, a filter to search for email addresses in the log data can be created. This filter can be designed to extract email addresses that meet specific criteria, such as containing the "@" symbol and a top-level domain (e.g., ".com", ".edu", etc.). Similarly, other filters can be created to extract other relevant information, such as user IDs, session IDs, timestamps, and application names.

After the relevant data points are extracted, data quality of the unstructured data can be evaluated by validating the extracted data points against predefined criteria or performing additional analysis to identify patterns and anomalies. For example, the email addresses can be compared against a list of known valid addresses or statistical analysis can be performed to identify outliers and anomalies in the log data.

In some implementations, the data quality results include a data quality score for the unstructured data. The data quality score can be a combined quality score based on the data quality assessment for each rule included in the set of customized rules. In some implementations, the data quality results can include a quality score corresponding to each rule base on whether that rule is satisfied, and if not satisfied, on what level it is not satisfied.

By checking against the validation rules, it is possible to test whether the unstructured data meets the defined criteria and possesses the required attributes. In this way, the computing system can detect potential weak points in unstructured data and derive recommendations for action, such as recommendations for potential modifications to the unstructured data. For example, the computing system can detect unstructured data with a data quality score not satisfying a quality threshold or unstructured data not satisfying one or more rules.

In some implementations, the computing system can obtain the unstructured data, based on the storage location of the unstructured data, from the data source and run the assessment code on the computing system. In some implementations, the computing system can send the assessment code to the data source, so that the assessment code can be run at the data source.

In some implementations, the computing system can convert the unstructured data into structured data, which can be easily used by machine learning models, easily interpreted by users, and more accessible by tools. Converting unstructured data into structured data allows the computer system to utilize tools and models available for quality checks on structured data. To convert the unstructured data to structured data, the computing system can clean the unstructured data; extract the data entity, such as person, place, business, as well as their internal relationships; organize the data in a certain pattern based on the context and the relevant domain; and store the data in a structured format, such as in a relational database. The information included in the unstructured data should be preserved in the structured data. The computing system can assess the data quality of the unstructured data by assessing the structured data. Specifically, the computing system can assess the data quality of the unstructured data by converting the unstructured data into structured data and triggering an assessment code corresponding to the set of customized rules on the structured data to check whether the structured data satisfies the set of customized rules.

At step 410, in response to determining that the unstructured data fails to satisfy the set of customized rules, the computing system can modify the unstructured data to satisfy the set of customized rules.

In some implementations, the computing system can generate and output for display a data quality report for the unstructured data including i) the data quality results for the unstructured data in each data file and ii) recommendations of potential modifications for rectifying unstructured data not satisfying one or more rules included in the set of customized rules.

The data quality report can include the inconsistencies and the inaccuracies of the unstructured data, such as one or more rules included in the set of customized rules that are not satisfied by the unstructured data, and how the one or more rules are not satisfied. The data quality report can also include recommendations of potential modifications for addressing the unstructured data not satisfying the one or more rules.

In response to receiving a confirming to rectify the unstructured data not satisfying the one or more rules, the computing system can make modification to the unstructured data not satisfying the one or more rules according to the recommendations of potential modifications. The computing system can run rectifying code on the unstructured data to modify the unstructured data, so that the unstructured data can satisfy the one or more rules. For example, if the postal code of a physical address does not match the physical address, the computing system can determine the right postal code based on the physical address and replace the un-matching postal code with the right postal code.

In some implementations, the computing system can provide the potential modifications to the unstructured data as a recommendation to a user, so that the user can determine whether to adopt that modification. The user can be the owner of the unstructured data or an administrative user managing the unstructured data. In response to receiving a confirmation—e.g., from the user—to rectify the unstructured data, the computing system can proceed to make the modifications such that the unstructured data satisfies the set of customized rules.

In some implementations, the computing system can train a machine learning model for making recommendations of potential modifications based on historical low quality unstructured data (historical unstructured data not satisfying one or more rules) and the user's feedback on modifying the low-quality unstructured data. The computing system can run the machine learning model to determine the potential modifications for rectifying the unstructured data not satisfying one or more rules in the set of customized rules.

In some implementations, the computing system can obtain the unstructured data, based on the storage location of the unstructured data, from the data source and run the rectifying code on the computing system. In some implementations, the computing system can send the rectifying code to the data source, so that the rectifying code can be run at the data source.

In some implementations, the process 400 for generating data quality report of unstructured data and improving the data quality can be implemented using machine learning techniques.

The order of steps in the process 400 described above is illustrative only, and the process 400 can be performed in different orders. In some implementations, the process 400 can include additional steps, fewer steps, or some of the steps can be divided into multiple steps.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages; and it can be deployed on a system of one or more computers in any form, including as a stand-alone program, e.g., as an app, or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to, one or more mass storage devices, and be configured to receive data from or transfer data to the mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on one or more computers having, or configured to communicate with, a display device, e.g., a LCD (liquid crystal display) or organic light-emitting diode (OLED) monitor, a virtual-reality (VR) or augmented-reality (AR) display, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback and responses provided to the user can be any form of sensory feedback, e.g., visual, auditory, speech or tactile; and input from the user can be received in any form, including acoustic, speech, or tactile input, including touch motion or gestures, or kinetic motion or gestures or orientation motion or gestures. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   obtaining, by one or more computing devices, metadata of multiple data files;
   analyzing a graph database representative of the multiple data files and generated using the metadata, to identify unstructured data included in one or more data files, the graph database representing features of the multiple data files, and relationships among the features of the multiple data files;
   obtaining a set of customized rules for the unstructured data based on context of the unstructured data;
   determining that the unstructured data fails to satisfy the set of customized rules; and
   in response to determining that the unstructured data fails to satisfy the set of customized rules, modifying the unstructured data to satisfy the set of customized rules.

2. The computer-implemented method of claim 1, further comprising:
   triggering assessment code corresponding to the set of customized rules on the unstructured data to check whether the unstructured data satisfies the set of customized rules.

3. The computer-implemented method of claim 1, further comprising:
   converting the unstructured data into structured data; and
   triggering assessment code corresponding to the set of customized rules on the structured data to check whether the structured data satisfies the set of customized rules.

4. The computer-implemented method of claim 1, further comprising:
   determining a data quality score for the unstructured data in each data file.

5. The computer-implemented method of claim 1, further comprising:
   determining a data quality score that is a combined quality score based on data quality assessment for each rule included in the set of customized rules.

6. The computer-implemented method of claim 1, wherein determining the set of customized rules comprises:
   performing natural language processing on metadata of the unstructured data of each data file to determine the context of the unstructured data, wherein the metadata comprises a data dictionary; and
   determining the set of customized rules that are applicable to the unstructured data using the context of the unstructured data.

7. The computer-implemented method of claim 1, further comprising:
   running a machine learning model to determine potential modifications for rectifying the unstructured data not satisfying one or more rules in the set of customized rules.

8. A non-transitory computer-readable medium encoded with instructions that, when executed by one or more computers, cause the one or more computers to perform operations comprising:
   obtaining metadata of multiple data files;
   analyzing a graph database representative of the multiple data files and generated using the metadata, to identify unstructured data included in one or more data files, the graph database representing features of the multiple data files, and relationships among the features of the multiple data files;
   obtaining a set of customized rules for the unstructured data based on context of the unstructured data;
   determining that the unstructured data fails to satisfy the set of customized rules; and
   in response to determining that the unstructured data fails to satisfy the set of customized rules, modifying the unstructured data to satisfy the set of customized rules.

9. The non-transitory computer-readable medium of claim 8, wherein the operations further comprise:
   triggering assessment code corresponding to the set of customized rules on the unstructured data to check whether the unstructured data satisfies the set of customized rules.

10. The non-transitory computer-readable medium of claim 8, wherein the operations further comprise:
    converting the unstructured data into structured data; and
    triggering assessment code corresponding to the set of customized rules on the structured data to check whether the structured data satisfies the set of customized rules.

11. The non-transitory computer-readable medium of claim 8, wherein the operations further comprise:
    determining a data quality score for the unstructured data in each data file.

12. The non-transitory computer-readable medium of claim 8, wherein the operations further comprise:
    determining a data quality score that is a combined quality score based on data quality assessment for each rule included in the set of customized rules.

13. The non-transitory computer-readable medium of claim 8, wherein determining the set of customized rules comprises:
    performing natural language processing on metadata of the unstructured data of each data file to determine the context of the unstructured data, wherein the metadata comprises a data dictionary; and
    determining the set of customized rules that are applicable to the unstructured data using the context of the unstructured data.

14. The non-transitory computer-readable medium of claim 8, wherein the operations further comprise:
    running a machine learning model to determine potential modifications for rectifying the unstructured data not satisfying one or more rules in the set of customized rules.

15. A system of hardware elements comprising one or more computers and one or more storage devices on which are stored instructions that are operable, when executed by the one or more computers, to cause the one or more computers to perform operations comprising:
  obtaining metadata of multiple data files;
  analyzing a graph database representative of the multiple data files and generated using the metadata, to identify unstructured data included in one or more data files, the graph database representing features of the multiple data files, and relationships among the features of the multiple data files;
  obtaining a set of customized rules for the unstructured data based on context of the unstructured data;
  determining that the unstructured data fails to satisfy the set of customized rules; and
  in response to determining that the unstructured data fails to satisfy the set of customized rules, modifying the unstructured data to satisfy the set of customized rules.

16. The system of claim 15, wherein the operations further comprise:
  triggering assessment code corresponding to the set of customized rules on the unstructured data to check whether the unstructured data satisfies the set of customized rules.

17. The system of claim 15, wherein the operations further comprise:
  converting the unstructured data into structured data; and
  triggering assessment code corresponding to the set of customized rules on the structured data to check whether the structured data satisfies the set of customized rules.

18. The system of claim 15, wherein the operations further comprise:
  determining a data quality score for the unstructured data in each data file.

19. The system of claim 15, wherein the operations further comprise:
  determining a data quality score that is a combined quality score based on data quality assessment for each rule included in the set of customized rules.

20. The system of claim 15, wherein determining the set of customized rules comprises:
  performing natural language processing on metadata of the unstructured data of each data file to determine the context of the unstructured data, wherein the metadata comprises a data dictionary; and
  determining the set of customized rules that are applicable to the unstructured data using the context of the unstructured data.

* * * * *